United States Patent [19]

Shimizu

[11] Patent Number: 5,062,510

[45] Date of Patent: Nov. 5, 1991

[54] SHIFTING DEVICE FOR LAWN MOWER AND THE LIKE

[75] Inventor: Toshiharu Shimizu, Iwata, Japan

[73] Assignee: Yamaha Hatsudoki Kabushiki Kaisha, Iwata, Japan

[21] Appl. No.: 346,476

[22] Filed: May 2, 1989

[30] Foreign Application Priority Data

May 6, 1988 [JP] Japan .................. 63-110182

[51] Int. Cl.⁵ ............... B60K 41/26; B60K 20/00
[52] U.S. Cl. .................. 192/4 C; 192/4 A; 74/473 R; 74/481
[58] Field of Search ............... 192/4 C, 4 A; 74/474

[56] References Cited

U.S. PATENT DOCUMENTS

| | | | |
|---|---|---|---|
| 2,981,388 | 4/1961 | Péras | 192/4 A |
| 3,618,718 | 11/1971 | Blaauw et al. | 192/4 C X |
| 3,645,368 | 2/1972 | Blaauw | 192/4 C X |
| 3,729,074 | 4/1973 | Anderson et al. | 192/4 C X |
| 4,156,369 | 5/1979 | Brown et al. | 74/474 |
| 4,246,989 | 1/1981 | Kohler | 192/4 A |
| 4,310,078 | 1/1982 | Shore | 192/4 A X |
| 4,352,302 | 10/1982 | McAuliffe et al. | 74/474 |
| 4,355,698 | 10/1982 | Barnes et al. | 192/4 A X |
| 4,496,035 | 1/1985 | Wanie | 192/4 C |
| 4,572,340 | 2/1986 | Pierce | 192/4 C |
| 4,620,575 | 11/1986 | Caba et al. | 192/4 C X |
| 4,796,736 | 1/1989 | Fee et al. | 192/4 C |
| 4,955,249 | 9/1990 | Wetoe | 74/474 X |
| 4,958,535 | 9/1990 | Swartzendruber | 74/474 X |

*Primary Examiner*—Richard Lorence
*Assistant Examiner*—David E. Henn
*Attorney, Agent, or Firm*—Ernest A. Beutler

[57] ABSTRACT

A garden tractor or lawn mower of the type having a hydrostatic transmission movable between forward and reverse drive conditions from a neutral condition. An arrangement is incorporated for positively moving the transmission to its neutral condition when the brake of the vehicle is operated.

9 Claims, 6 Drawing Sheets

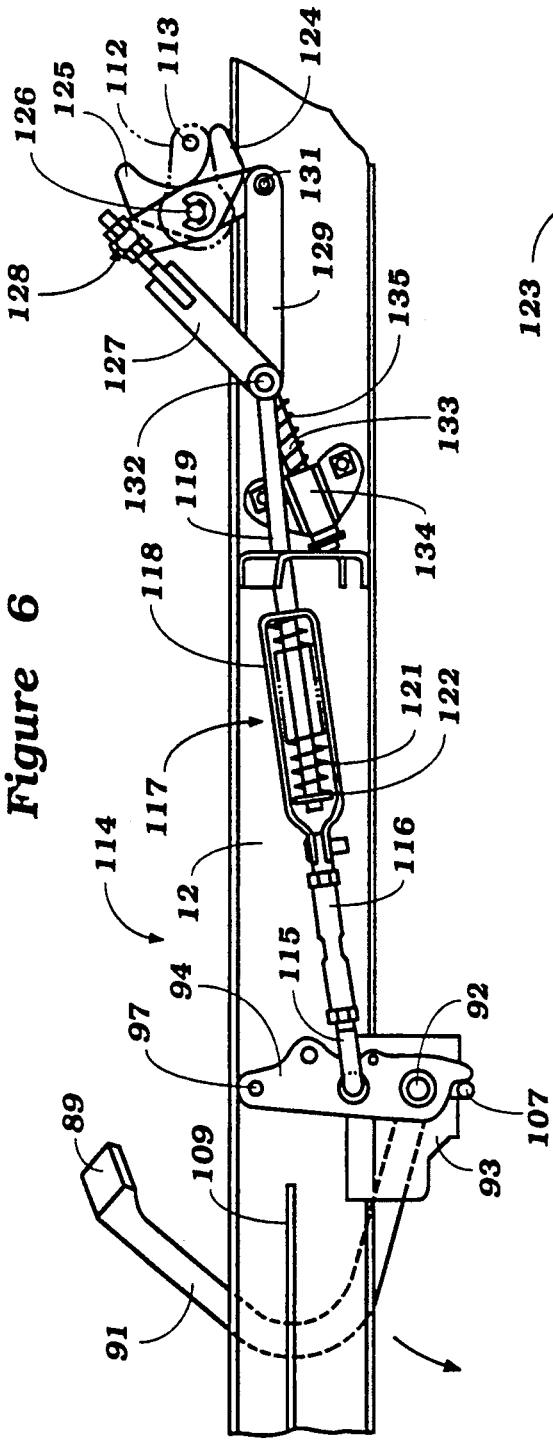

SHIFTING DEVICE FOR LAWN MOWER AND THE LIKE

BACKGROUND OF THE INVENTION

This invention relates to a shifting device for a lawn mower and the like and more particularly to an improved transmission and brake control for such vehicles.

In many forms of vehicles such as riding mowers or the like, there is provided a transmission control that is movable between a neutral position and a drive position for effecting driving of the vehicle. In addition, these vehicles also employ brake systems for stopping the motion of the vehicle. Of course, if the brake is actuated when the transmission is in a forward drive condition, the load on the braking system is increased and stopping of the vehicle is difficult. In addition, when the vehicle is stopped, if the transmission is not returned to neutral, the engine will stall.

It may be possible to provide some form of interconnection between the brake operator and the transmission so as to return the transmission to neutral when the brake operator is actuated. However, if linkage systems of the conventional type are employed for this purpose, it is necessary to insure that the transmission will be moved truly to its neutral position when the brake is operated and the linkage system should also be such that it will not interfere with the movement of the brake to a fully engaged position. In order to achieve these purposes, conventional linkage systems are not truly satisfactory because they can be quite complicated and cumbersome. In addition, it is desirable to provide an improved and simplified arrangement wherein the transmission will be moved and positively engaged in its neutral position when the brake is actuated.

The problems aforedescribed are particularly acute in conjunction with transmissions where there is both a forward and a reverse drive mode. It is desirable to insure that the transmission will be operated to its neutral condition when the brake is applied and the vehicle is traveling either forward or reverse. With such an arrangement, the problems as aforenoted are significantly magnified.

It is, therefore, a principal object of this invention to provide an improved, interrelated transmission and brake control for a vehicle.

It is a further object of this invention to provide a vehicle transmission and brake control wherein the transmission is moved to its neutral condition when the brake is operated and is positively retained in the neutral condition.

It is a further object of this invention to provide an arrangement wherein the transmission will be moved to its neutral condition when the brake is applied regardless of whether the vehicle is operating in a forward or reverse direction.

SUMMARY OF THE INVENTION

This invention is adapted to be embodied in a vehicle having a transmission operative between a neutral condition and a drive condition. Transmission operator means are selectively operable by an operator for operating the transmission between its neutral and drive conditions. The vehicle is provided further with a brake for braking an operation of the vehicle. A brake operator is selectively operable by an operator and means connect the brake operator to the brake for operating the brake. In accordance with the invention, means are provided for moving the transmission to its neutral condition from a drive condition in response to operation of the brake operator.

BRIEF DESCRIPTION OF THE DRAWINGS

FIG. 6 is a side elevational view, in part similar to FIG. 5, showing the mechanism for moving the transmission to its neutral condition when the brake is applied and showing the arrangement in the brake released condition.

FIG. 7 is a side elevational view, in part similar to FIG. 6, and shows the mechanism in the brake operating position.

DETAILED DESCRIPTION OF THE PREFERRED EMBODIMENT

Figure 1:
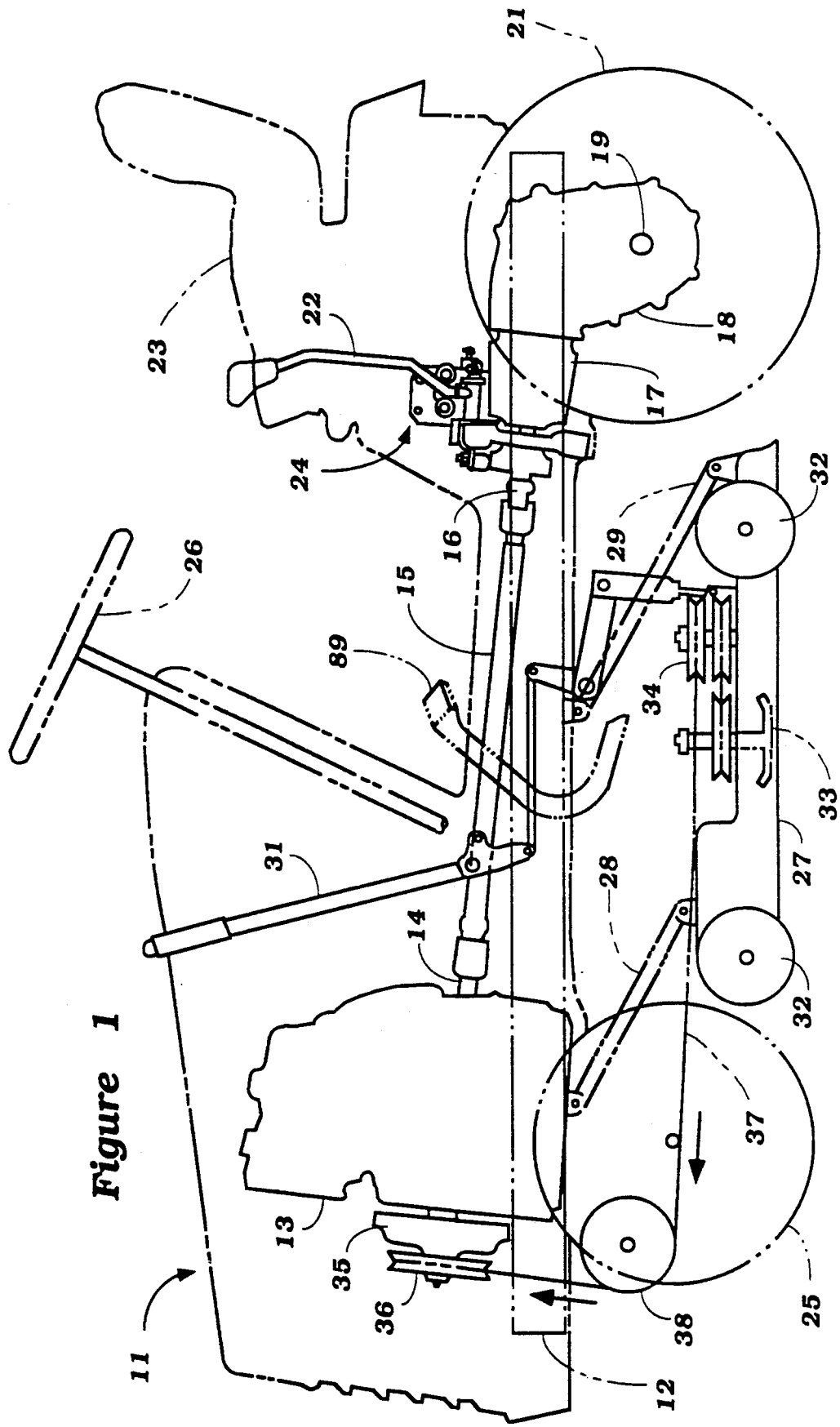
FIG. 1 is a side elevational view of a tractor with a lawn mower attachment constructed in accordance with an embodiment of the invention, with portions of the tractor shown in phantom.

Referring in detail to the specific embodiment and initially to FIG. 1, a lawn or garden tractor such as a riding mower constructed in accordance with an embodiment of the invention is identified generally by the reference numeral 11. The tractor mower 11, which is a typical environment in which the invention may be practiced, is comprised of a frame 12 that supports an internal combustion engine 13 of any known type. The engine 13 has an output shaft 14 that is coupled by a drive shaft 15 to an input shaft 16 of a hydrostatic drive, indicated generally by the reference numeral 17. The hydrostatic drive 17, as will be described later, comprises a fluid pump of the swash plate type so as to vary the output of the pump and a fluid motor that is driven by the pump. This fluid motor is drivingly coupled by a final drive 18 to a rear axle 19 for driving the rear wheels 21 of the tractor in a known manner. As noted, the hydrostatic drive 17 may be of any known type such as is shown in the copending application entitled "Shifting Device For Lawn Mower And The Like", Ser. No. 325,305, filed Mar. 17, 1989, and assigned to the assignee hereof, and includes a swash plate control mechanism which is controlled by means of a shift lever 22 that is positioned in proximity to the rider's seat 23. The shift lever 22 is interconnected to the swash plate control mechanism by a control linkage, indicated generally by the reference numeral 24.

A pair of dirigible front wheels 25 are supported at the forward end of the frame 12 in a known manner and are steered by means of a steering wheel 26 that is positioned forward of the rider's seat 23.

The tractor 11 may serve any of a wide variety of purposes and is depicted as being of the lawn mower type and carries a lawn mower attachment, indicated generally by the reference numeral 27 that is supported beneath the frame 12 by a parallel linkage system 28 and 29. The height of the lawn mower attachment 27 may be adjusted by a control lever 31 and the lawn mower attachment when engaged with the ground rides along the ground on a pair of wheels 32.

The lawn mower attachment has a pair of cutter blades 33, only one of which appears in FIG. 1, that are driven by a pulley mechanism 34. The pulley mechanism 34 is driven from the engine output shaft 14 by means of an electrically operated clutch 35 that couples the output shaft 14 to a driven pulley 36. A driving belt 37 transfers drive from the driven pulley 36 to the pulley assembly 34 along a path that includes a belt tensioner 38.

It should be understood that the construction as thus far described may be considered to be conventional.

Figure 2:
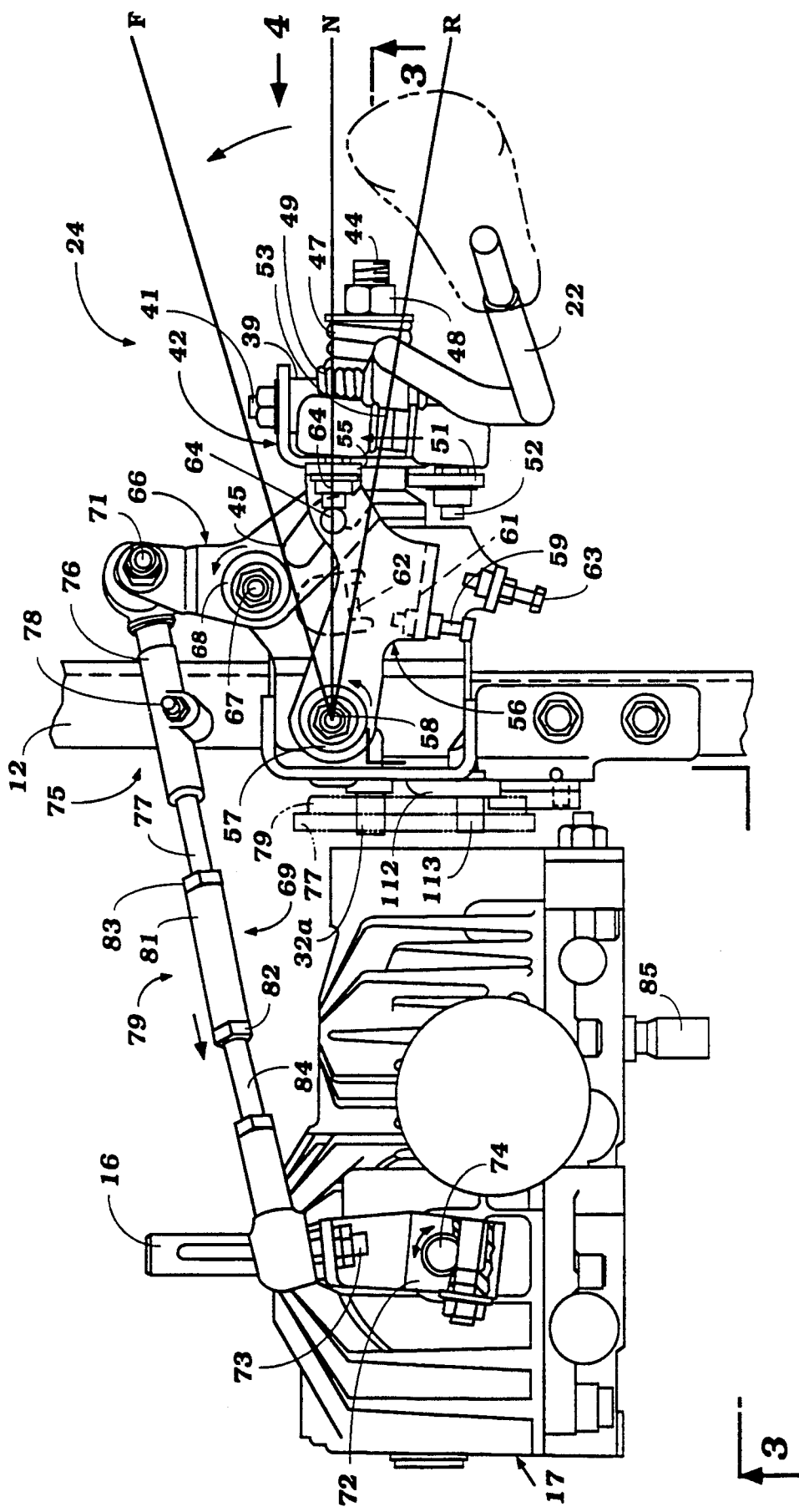
FIG. 2 is an enlarged top plan view showing the transmission and its control mechanism.
Figure 3:
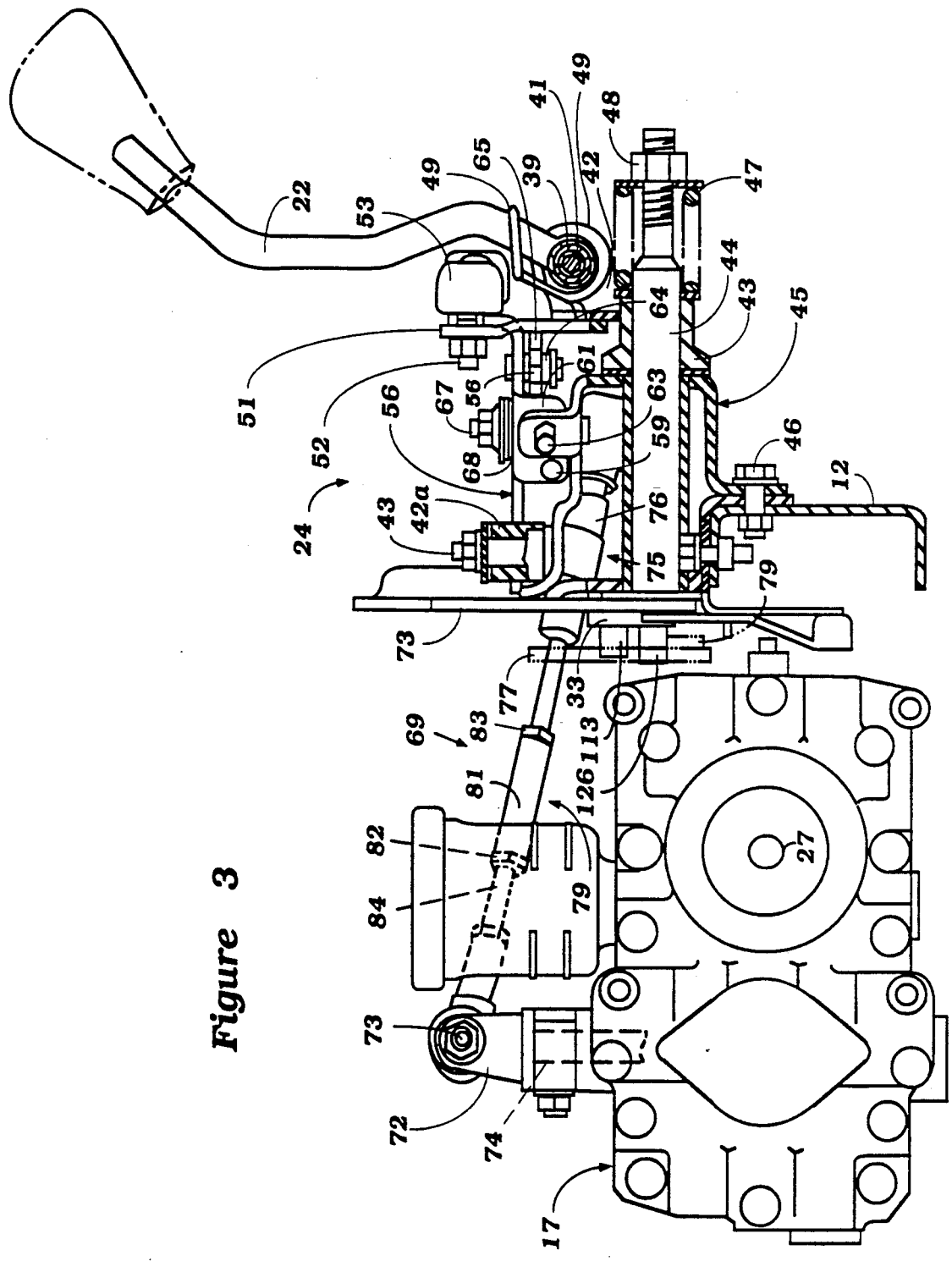
FIG. 3 is a view, partially in section, taken along the line 3—3 of FIG. 2.
Figure 4:
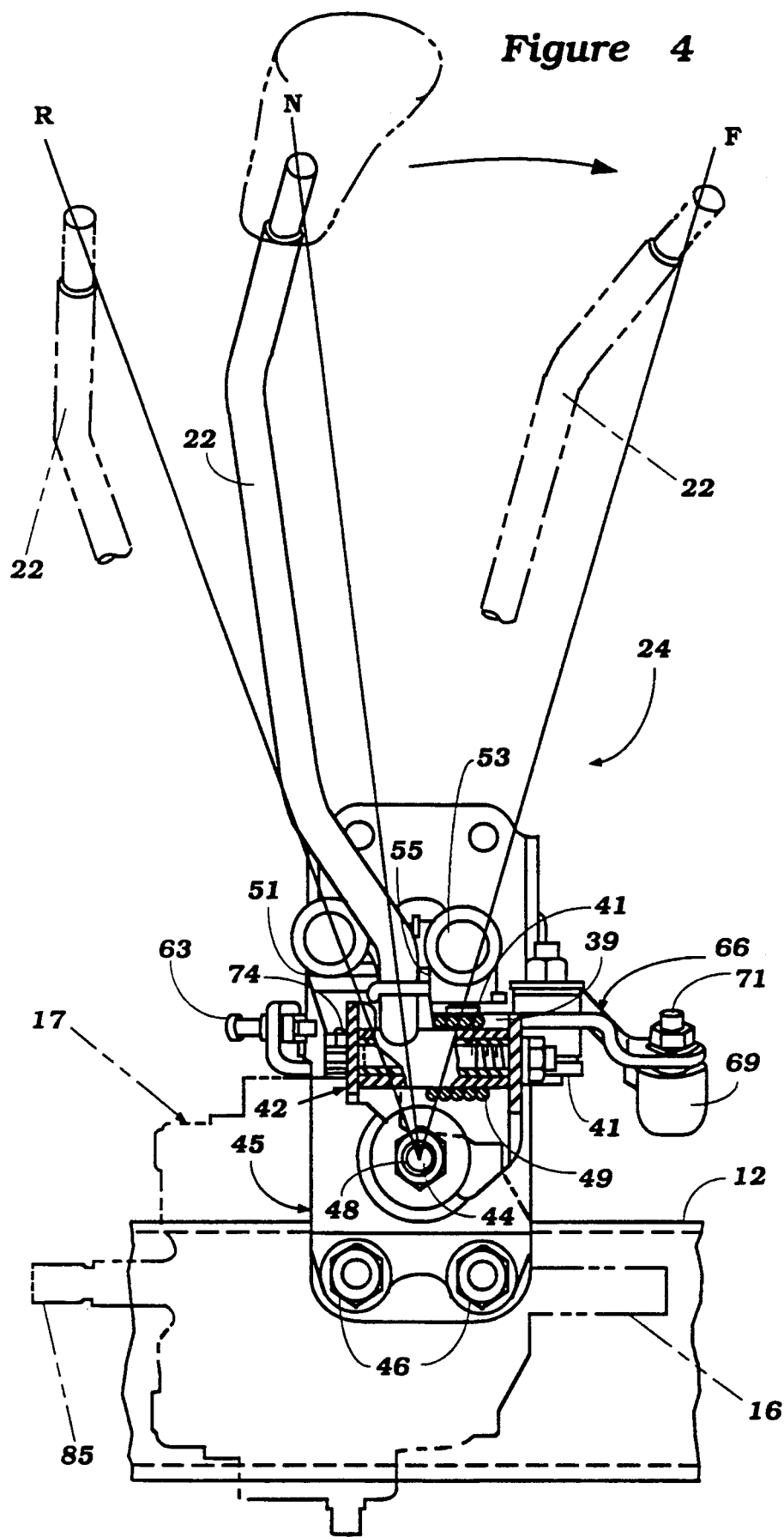
FIG. 4 is a side elevational view taken in the direction of the arrow 4 in FIG. 2, with a portion broken away.

Referring now to FIGS. 2 and 4, the shift lever 22 has a generally tubular base 39 that is journaled upon a pivot shaft 41. The pivot shaft 41 is, in turn, affixed to a pair of outstanding ears formed in a bracket assembly 42. The bracket assembly 42 is, in turn, affixed to an annular hub 43 which has a splined connection to a pivot shaft 44 that is journaled on a mounting bracket assembly 45. The bracket assembly 45, is, in turn, affixed to the frame 12 by means of fasteners 46.

It should be noted that the aforedescribed construction permits the shift lever 22 to be pivoted about a rotational axis defined by the shaft 44 as shown in FIGS. 2 and 4 from the neutral position to a full forward (F) and full reverse (R) position as shown in the phantom lines. The support hub 43 for the shift lever 22 may move to a limited extent axially along the shaft 44 and a coil compression spring 47 that is held under tension by a locking nut 48 normally resists this axial movement.

In addition to being axially movable along the shaft 44, the shift lever 22 may also pivot about the pivot shaft 41. A torsional spring 49 is interengaged between the shift lever 22 and the bracket 42 so as to yieldably resist pivotal movement about the pivot shaft 41.

The bracket 42 has an upstanding arm 51 that carries a spherical joint 52 to provide a universal connection to one end of a shift link 53. The forward end of the shift link 53 has a similar spherical connection 54 to an upstanding flange 55 of a shift lever, indicated generally by the reference numeral 56. The lever 56 has a journal portion 57 that is rotatably journaled on a pin 58 which is, in turn, carried on the supporting bracket 45.

The extreme pivotal ranges of movement of the shift lever 56 are controlled by means of a first adjustable stopper 59 that is carried by a depending flange 61 of the shift lever 56 and which cooperates with a fixed adjustment 62 formed on the supporting bracket 45. Movement in the opposite direction is limited by the contact of the flange 61 with an adjustable stopper 63 that is fixed in an upstanding flange of the supporting bracket 45.

The shift lever 56 carries a follower pin 64 that is received within a generally Z-shaped cam slot 65 formed in a second shift lever 66. This second shift lever 66 is rotatably journaled on the supporting bracket 45 by means of a pivot pin 67 that is received within a journaling boss portion 68 of the shift lever 66.

The configuration of the cam slot 65 and its relation to the movement of the follower pin 64 is such as to provide some lost motion in the neutral position of the shift lever 22. That is, the central portion of the Z cam slot 65 is configured so that there will be, in effect, a dwell period during the movement of the shift lever 22 and shift lever 56 before the shift lever 66 is pivoted. As a result, the actual setting of the neutral position will be less critical than with previously proposed constructions.

The action of the spring 47 on the shift lever hub 43 urges the hub into frictional engagement with the bracket 45 to frictionally retain the shift mechanism in the selected position without interfering with the shifting movement.

The second shift control lever 66 is formed as a bell crank with the cam slot 65 being formed in one of its arms. A control rod or link assembly, indicated generally at 69, is pivotally connected at one end to the other arm by means of a spherical joint 71. The link assembly 69 is adjustable in length in a manner and for a reason to be described. The opposite end of the link assembly 69 is connected to a control lever 72 by means of a spherical joint 73. The control lever 72 is affixed to a transmission control shaft 74 that is coupled in a suitable manner to a swash plate assembly of the hydrostatic transmission 17 for controlling the transmission 17 in the manner described in application Ser. No. 325,305, now U. S. Pat. No. 4,962,675, the disclosure of which is incorporated herein by reference.

As has been noted, the link assembly 69 is adjustable for length. This is to insure that the control lever 72 and control shaft 74 will be in the neutral position when the shift lever 66 is in its neutral position. This adjusting mechanism includes a first, coarse adjustment system indicated generally by the reference numeral 75. The coarse adjusting mechanism 75 includes a split sleeve 76 that is connected to the spherical joint 71 and which slidably receives a rod 77. The rod 77 is clamped within the sleeve 76 by means of a clamping mechanism 78 so as to permit the aforenoted coarse length adjustment. This coarse length adjustment may provide a range of approximately plus or minus 7 mm in length variation.

In addition, the link assembly 69 includes a fine adjusting mechanism, indicated generally by the reference numeral 79 that is comprised of a sleeve 81 having threaded ends 82 and 83 of slightly different pitch to respective ends of the rod 84 and the rod 77. The rod 84 is connected to the spherical joint 73 and rotation of the sleeve 81 will achieve a length of adjustment of 0.5 mm for one rotation of the sleeve which corresponds to the pitch differences in the threads 82 and 83. In a preferred embodiment of the invention, the pitches can be 1.25 mm and 0.75 mm. This affords a total fine adjustment of plus or minus 3 mm.

The hydrostatic transmission 17 permits the input shaft 16 to drive an output shaft 85 which is coupled to the input of the final drive 18 in a known manner at selected forward and reverse speed ratios. In addition, as aforenoted, there is further provided a neutral condition.

The vehicle 11 is further provided with a brake assembly and this brake assembly is contained within the final drive 18 for braking the rotation of the axle shaft 19 in a suitable manner. This brake mechanism is indicated schematically at 86 and includes an actuating lever 87 that is journaled within the casing of the final drive 18 on a pivot shaft 88 (FIG. 5).

The brake actuating lever 86 is operated by means of a remotely positioned brake pedal 89 that is affixed to a brake lever 91 in proximity to the feet of the rider seated on the seat 23. The brake lever 91 is affixed to a shaft 92 that is journaled in a support plate 93 fixed to the frame 12 in a suitable manner. A brake actuating lever 94 is affixed to the shaft 92 and has an overload release connection 95 to one end of a brake actuating link 96. The opposite end of the brake actuating link 96 is connected to the brake control lever 87.

Figure 5:
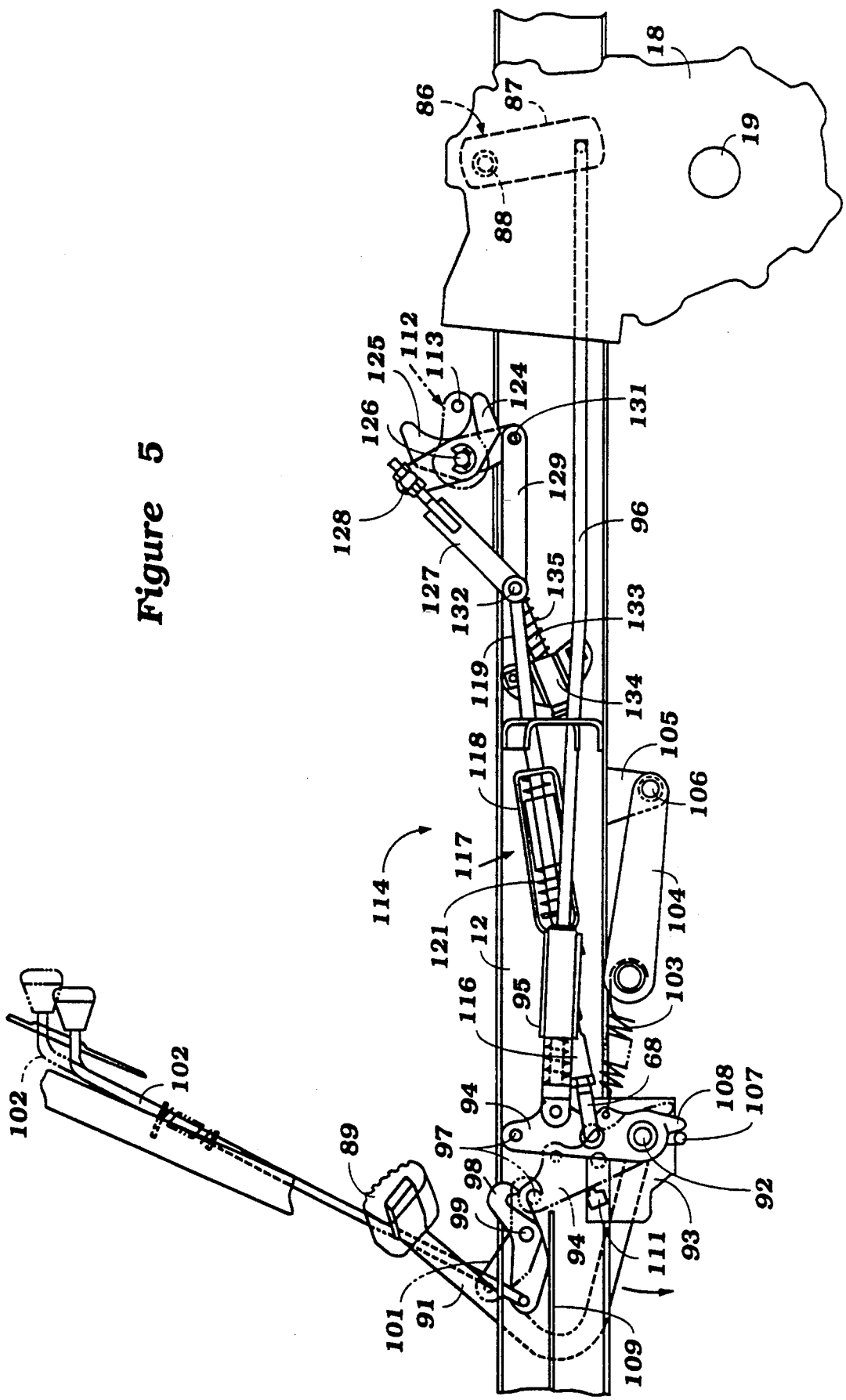
FIG. 5 is a side elevational view showing the interrelationship between the transmission control mechanism and the brake control mechanism.

When the operator depresses the brake pedal 89, the brake lever 91 will rotate in a counterclockwise direction as shown by the arrow in FIG. 5 and effect pivotal movement of the brake lever 94 in this counterclockwise direction. This will transmit a force on the link 96 through the overload release mechanism 95 so as to pivot the brake lever 87 and operate the brake 86. Once the brake 86 is actuated, if the brake pedal 89 is depressed further, the overload release mechanism 95 will permit over-travel of the lever 94 without damage to the brake 86.

There is further provided a parking brake arrangement that consists of a pin 97 carried at the upper end of the brake actuating lever 94. The pin 97 is adapted to be engaged by a hook-like locking member 98 that is pivotally supported on the frame 12 by means of a pivot pin 99. The lever has a further arm 101 that is connected to a parking brake lever 102. If the operator wishes to engage the parking brake, the brake pedal 89 is depressed so that the brake actuating lever 94 will be rotated to the phantom line position shown in FIG. 5 and the parking brake lever 102 is then drawn upwardly. This will pivot the locking member 98 into engagement with the pin 97 and hold the brake 86 in its engaged position. To release the parking brake, the operator depresses the brake pedal 89 and releases the parking brake lever 102.

The brake 86 and mechanism for actuating it already described is normally held in its released position by means of a coil compression spring 103 that is connected at one end to the brake actuating lever 94 so as to urge it in a clockwise direction. The other end of the spring 103 is connected to a link 104 that is connected to a frame bracket 105 by means of a pin 106. The brake actuating lever 94 is stopped in its fully released position by means of a stop pin 107 carried by the bracket 93 and engaged by a tang 108 on the lever 94 when the brake is in its fully released position.

The maximum degree of movement of the brake lever 94 in its actuated condition is limited by means of a stopper plate 109 carried by the frame 12 in proximity to the parking brake pawl 98.

The vehicle 11 may also be provided with a system that prevents starting of the engine 13 unless the brake 86 is engaged. For this purpose, an interlock switch 111 may be carried by the bracket 93 and is engaged by the lever 94 when the brake 86 is actuated. The switch 111 can be wired into the starting circuit in such a way that the starter cannot be operated unless the brake actuating lever 94 is in its engaged position.

As has been previously noted, it is desirable to provide a mechanism for returning the transmission 17 to its neutral position when the brake 86 is activated. To achieve this result, there is provided a lever 112 (FIGS. 2 through 7) that is affixed to the inner end of the shaft 44 and hence will rotate with the shift lever 22. A brake operated transmission release pin 113 is affixed to the lever 112 and is adapted to be engaged by a transmission release mechanism, indicated generally by the reference numeral 114, upon actuation of the brake pedal 89 so as to move the shift lever 22 and transmission control shaft 74 into their neutral positions when the brake pedal 89 is depressed.

The transmission release mechanism 114 basically is designed so as to engage the pin 113 and rotate the lever 112 and shaft 44 to their neutral positions when the brake pedal 89 is applied and regardless of whether the transmission 17 is in either the forward drive or reverse drive modes. The mechanism 114 includes a link 115 that is pivotally connected at one end to the brake operating lever 94 at a point spaced between the pivot pin 92 and the pivotal connection of the brake operating overload release mechanism 95 to this lever. This point is also inwardly of the pin 97.

The link 115 has an adjustable connection 116 to an overload release mechanism, indicated generally by the reference numeral 117. The overload release mechanism 117 includes a caging member 118 into which a rod 119 extends. A coil compression spring 121 acts between the caging member 118 and a washer 122 that is fixed to the caged end of the rod 119. The coil compression spring 121 normally has sufficient rigidity so as to transmit movement of the link 115 into movement of the rod 119. However, once the transmission release pin 113 has been moved to its neutral position, the overload release mechanism 117 will yield so as to permit retention in this position, as will become apparent.

The rod 119 is connected at the end opposite to the washer 122 by means of an operating system to a scissors-like mechanism, indicated generally by the reference numeral 123 and comprised of a first bell crank having a locking jaw 124 and a second bell crank having a locking jaw 125. The bell cranks having the locking jaws 124 and 125 are pivotally supported on an end 126 of the shaft 44.

The bell crank carrying the locking jaw 124 is operated by means of a link 127 that is adjustably connected to the other arm of the bell crank by an adjustable connection 128. In a like manner, the jaw 125 is operated by a link 129 that has a pivotal connection by means of a pivot pin 131 to the other arm of the bell crank forming the jaw 124. The links 127 and 129 are both pivotally connected to the end of the rod 119 by a single pivot pin 132. The pivot pin 132 is also connected to a link 133 that is slidably supported within a frame mounted bracket 134 and which is urged to an extended position by a coil compression spring 135.

FIG. 6 shows the neutral release mechanism 114 in a position when the brake pedal 89 is not depressed. In this condition, the spring 135 will urge the links 127 and 129 outwardly so as to pivot the jaws 124 and 125 to an opened position. In this position, the lever 112 and pin 113 carried by it may rotate freely between the forward drive position as shown in FIG. 6, the neutral drive position and the full reverse drive position. The spacing between the jaws 124 and 125 when the brake pedal 89 is not depressed is sufficient to allow this free movement.

When the brake pedal 89 is depressed, however, to operate the brake mechanism in the manner previously described (FIG. 7), the lever 94 is rotated in the counterclockwise direction exerting a pull on the link 115. When this occurs, the overload release mechanism 117 moves to the left and during this initial movement, the coil compression spring 121 causes the rod 119 also to move to the left as shown in this figure. This compresses the spring 135 and effects a pull on the levers 127 and 129 so as to act on the locking jaws 124 and 125 much in a manner like a scissors to pivot them toward a closed position as shown in this figure. Therefore, one of the jaws 124 or 125 will contact the pin 113 and rotate the lever 112 in a direction to move the transmission control shaft 74 and shift lever 22 to its neutral position. In the assumed case that the transmission was in the forward drive mode, the jaw 124 will contact the pin 113 and accomplish this movement. If the transmission were shifted into reverse, the jaw 125 would be the first one to contact the pin 113.

As the brake pedal 89 is continued to be depressed, the jaws 124 and 125 will move together so as to rigidly retain the pin 113 in its neutral condition. If the pedal 89 is further depressed, the overload release mechanism 117 will yield by compression of the spring 121 and allow over-movement without further pivotal movement of the locking jaws 124 and 125. However, the pin 113 will be rigidly held in its neutral condition.

Once the brake pedal 89 has been released, the operator can again shift the transmission into any desired drive mode without encumberance by the neutral releasing mechanism 114.

It should be readily apparent from the foregoing description that the described construction is extremely effective in operating the transmission 17 so as to move it into neutral when the brake pedal is depressed without requiring any uncomplicated adjustment in the mechanism. Furthermore, the transmission will be insured to be locked into neutral by the cooperation of the two oppositely acting locking jaws and thus very good and effective operation is obtained.

The foregoing description is that of a preferred embodiment of the invention and the invention can be utilized in conjunction with a wide variety of vehicles, braking mechanisms and transmissions. Various changes and modifications from the described embodiment may be made without departing from the spirit and scope of the invention, as defined by the appended claims.

I claim:

1. In a vehicle having a transmission operative between a neutral condition and a drive condition, transmission operator means selectively operable by an operator for operating said transmission between its neutral and drive conditions, a brake for braking an operation of said vehicle, a brake operator selectively operable by an operator, and means connecting said brake operator to said brake for operating said brake, the improvement comprising means for positively moving said transmission to its neutral condition from a drive condition in response to operation of said brake operator comprising a pair of pivotally connected jaw members acting on a pin member affixed to the mechanism for coupling said transmission operator means to said transmission.

2. In a vehicle as set forth in claim 1 wherein the transmission and transmission operator are movable between a neutral condition, a forward drive condition and a reverse drive condition and the means for positively moving the transmission to its neutral condition is operative to move the transmission to its neutral condition from either the forward drive or reverse drive conditions in response to operation of the brake operator.

3. In a vehicle as set forth in claim 1 wherein the pivotally operated jaw members positively retain said transmission in its new condition from movement in either direction therefrom.

4. In a vehicle as set forth in claim 3 further including lost motion connection means between the brake operator and the pivotally operated jaw members for retaining the transmission in the neutral condition when the brake is operated more than a predetermined amount.

5. In a vehicle as set forth in claim 4 wherein the transmission and transmission operator are movable between a neutral condition, a forward drive condition and a reverse drive condition and the pivotally mounted jaw members move the transmission to its neutral condition from either the forward drive or reverse drive conditions in response to operation of the brake operator.

6. In a vehicle as set forth in claim 1 wherein the transmission comprises a hydrostatic transmission for powering the vehicle.

7. In a vehicle as set forth in claim 6 wherein the transmission and transmission operator are movable between a neutral condition, a forward drive condition and a reverse drive condition and the pivotally mounted jaw members move the transmission to its neutral condition from either the forward drive or reverse drive conditions in response to operation of the brake operator.

8. In a vehicle as set forth in claim 7 wherein the pivotally mounted jaw members positively retain said transmission in its neutral condition from movement in either direction therefrom.

9. In a vehicle as set forth in claim 8 further including lost motion connection means between the brake operator and the pivotally mounted jaw members for retaining the transmission in the neutral condition when the brake is operated more than a predetermined amount.

* * * * *